(12) United States Patent
de Abreu

(10) Patent No.: US 6,294,893 B1
(45) Date of Patent: Sep. 25, 2001

(54) RADIANT SYSTEM IN ACCUMULATORS AND RESULTANT PRODUCT

(75) Inventor: Paulo Emmanuel de Abreu, Parana (BR)

(73) Assignee: Guacemmi Participacoes Societarias Ltda., Curitiba (BR)

(*) Notice: Subject to any disclaimer, the term of this patent is extended or adjusted under 35 U.S.C. 154(b) by 0 days.

(21) Appl. No.: 09/230,510
(22) PCT Filed: May 20, 1998
(86) PCT No.: PCT/BR98/00027
 § 371 Date: Jan. 26, 1999
 § 102(e) Date: Jan. 26, 1999
(87) PCT Pub. No.: WO98/54816
 PCT Pub. Date: Dec. 3, 1998

(30) Foreign Application Priority Data

May 26, 1997 (BR) .................................................. 9705871

(51) Int. Cl.[7] .................................................. H01M 10/46
(52) U.S. Cl. .................................................. 320/101; 429/152
(58) Field of Search .................................... 320/101, 107; 429/17, 19, 21, 24, 94, 96, 97, 98, 99, 100, 152, 160

(56) References Cited

U.S. PATENT DOCUMENTS 4,703,989   11/1987   Price et al. ........................ 439/283
4,787,125 * 11/1988   Pinsky et al. ...................... 429/212
5,264,306 * 11/1993   Walker, Jr. et al. ................. 429/160
5,580,677 * 12/1996   Morishita et al. .................. 429/152

FOREIGN PATENT DOCUMENTS

WO9639731   12/1996   (WO) .

* cited by examiner

Primary Examiner—Peter S. Wong
Assistant Examiner—Lawrence Luk
(74) Attorney, Agent, or Firm—Oblon, Spivak, McClelland, Maier & Neustadt, P.C.

(57) ABSTRACT

A radiant system in accumulators and a resultant product objectifying optimization of energy's generation, storage and use, allowing the reduction of costs through ultra-fast recharges, using pulsating processes that cause high-frequency radiations, through tensions higher than ones currently used, without losses in the characteristics of electricity's conventional use, allowing greater facilities for its use. The system allows the ultra-fast recharge of accumulators and or capacitors, adding several pairs of conducting branch lines with adequate insulation, to proceed the recharging of the accumulators and or capacitors by a radiant effect through the lower part of the plates, by the pulsating tension that causes a high-frequency radiation, feeding the plates preferentially in the sequence from the plates in the extremities to the ones in the centers, acting simultaneously on all the cells, totally independent from the conventional system, which is preserved for the discharge of the accumulators and or capacitors through the upper part of the plates, using the terminals that are currently used.

8 Claims, 3 Drawing Sheets

RADIANT SYSTEM IN ACCUMULATORS AND RESULTANT PRODUCT

BACKGROUND OF THE INVENTION

1. Field of the Invention

The present invention is related to a system for the automatic recharge in accumulators and or capacitors, in order to optimize the generation, storage and usage of energy, allowing costs reductions through ultra fast recharging cycles by a pulsing process that generates high frequency radiation, through superior tensions that are used on the actual recharging cycles, with no prejudice on the actual usage of electricity, allowing than facilities on its applications.

2. Discussion of the Background

The purpose of accumulators and or capacitors is to maintain, even though transitory, a determinate electromotive force, between the two terminals of one electric charge to be fed. For energy recharging, the circuits have two impedances: the internal, from the self accumulator and or capacitor, and the one due to the recharging equipment, here reported for illustrative objectives for a lead-acid accumulator, that is the most commonly used. Herein an accumulator and or capacitor is referred to only by the word accumulator.

The actual systems used on accumulators recharging do not use the effects due to corpuscular radiation properties, that allow better efficiency on the transference of power in one circuit with the same impedance, neither the constructive principles described as follows, so, restricted to equipment that maintain long periods of time for recharging of slow charge rates, due to the limitations of the adopted systems. The accumulators on use today operate when charging and discharging cycles on the same energetic being, by only one pair of terminals the electric current is spread on all the plates simultaneously, showing higher impedance to the current passage and others inconveniences that limit the minimum time for a fast recharging cycle.

SUMMARY OF THE INVENTION

The present invention adopts a cycle process, operating with two accumulators in a parallel regime of charging and discharging, or it means that, when one of the two accumulators supplies energy for the system, the other receives the charge and vice versa. The accumulators use preferentially several pairs of conductors branch lines with adequate isolation, plugged preferentially on the center of the inferiors edges of the plates to proceed the automatic charging or the self supported operation on the accumulators of high frequency radiant effect activated by the inferior border of the plates through continuous current used by the system, originated by the cyclic pulsation of the operational tension preferentially superior of the usual tensions adopted on the usual system, energizing the plates, in the case of more than one pair by cell, preferentially by sequence, on the way of the pairs from the plates from the borders to the center, acting simultaneously on all the cells, independent of the actual system, that is preserved for the service of cyclic discharges on the accumulators by the superior part of the plates, through terminals used nowadays, preferentially symmetrical, it means, in the center of the superior borders of the plates at normal tension, that are characteristics obtained by the potential of the material of the pairs of electrodes used on the plates, and the number of cells that constitutes the accumulator and the manner that are associated the cells in serial or parallel connection.

In the present invention were developed new elements, based on the process that adopt corpuscular properties of radiation, for the transference of electric charges with more facility, speed and efficiency, through of radiation iterating with the matter based on the Quantum Physics, particularly on the Theory elaborated by Albert Einstein in 1905 about the photoelectric effect, on the atomic model by Niels Bohr in 1913, as well as on the Quantum studies of the multielectronic atoms made by Douglas Hartree and collaborators, started since 1928 up to nowadays. The charge transference is done through a completely new radiant process that is obtained by, transferring on each half cycle, plates of one of the sets of the accumulator as a conductor, of inverse polarization, of the output of the other accumulator associated in parallel and vice versa, through a system controlled by electronic circuits designed for this purpose, developed with well known components and dedicated software, transforming itself in a logic monitor and totally safe. During the transfer of charges inside the accumulator, the electric current should locate preferentially on the data recommended by the accumulator supplier, but, with efficiency incremented by the radiant effects of the photons of the electromagnetic iterations of the electrons, obtained through a pulsing voltage preferentially over 12.1 Volts in the specific case of a lead acid accumulator, as well as on the transmission of high power that justifies the reduced recharge time of accumulators, based on the theory of Hideki Yukawa in 1935 partially checked by Carl David Anderson in 1937 and finally discovered by Cecil Frank Powell in 1947; the mesons and the start of the particles physics.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

A process where the radiation interacts with the matter, the photoelectric effect, the Compton effect and the Production of Pairs, that covers the scattering or absorption of the radiation by the matter, is shown on the graph of FIG. 1. In order to make the comprehension easier of the constructive method adopted at the radiant system, the subject of this invention, is shown in FIGS. 2A–2C and 3, that are shown only as reference and not restrictive to the final shape of the invention.

DESCRIPTION OF THE PREFERRED EMBODIMENTS

Figure 1:
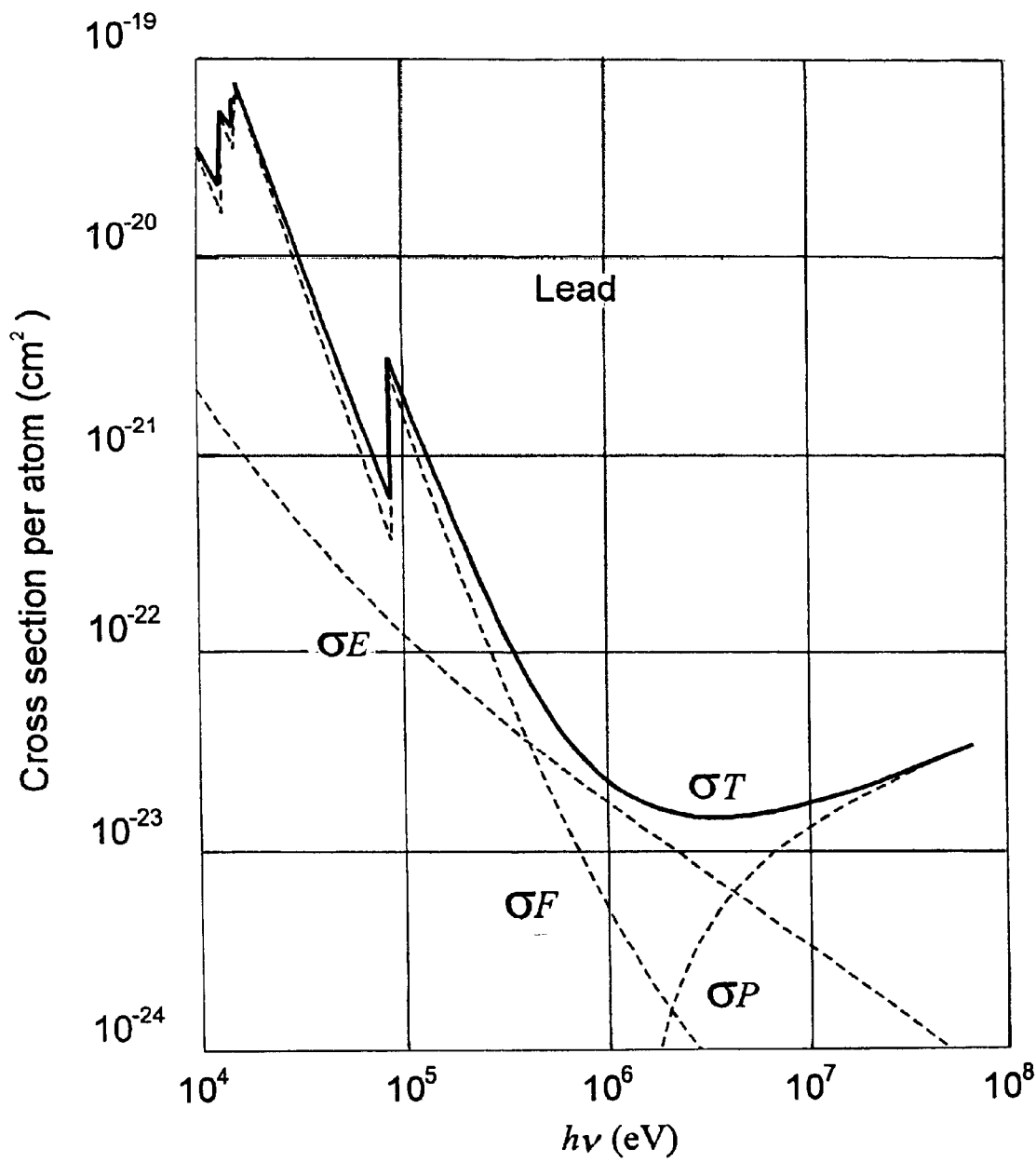

On the graphic of FIG. 1, are shown the cross section measured for an atom of the $_{82}Pb$ as a function of the energy of the photon hv:

$\sigma E$=Scattering cross section ($cm^2$)

$\sigma F$=Photoelectric cross section ($cm^2$)

$\sigma P$=Production of Pairs cross section ($cm^2$)

$\sigma T$=Total cross section ($cm^2$)

$\sigma T = \sigma E + \sigma F + \sigma P$

The scattering cross section indicates the probability that scattering occurs or by the Thomson Process or by the Compton Process. In the case of the lead that has a high atomic number and so, electrons with strong connection, when the energy of the photon is lower than $10^5$ eV, the Quantum results confound with the classical results and the Thomson scattering is dominant. The discontinuity of the Photoelectric cross section occur at the binding energy of the different electrons of the atom; when hv decreases below the binding energy of a specific atom, the photoelectric process involving this electron is impossible. The Production of Pairs cross section grows from zero when hv exceeds the limit energy $2m_oc^2$ necessary to materialize one pair. The total cross section of FIG. 1 specifies the probability of a photon having any kind of iteration with an atom. We can note on FIG.1 that the intervals of energy of where each one of the three process gives the most important contribution for the total cross section σT for the Lead are approximately:

Photoelectric effect: hv<5×10$^5$ eV

Scattering: 5×10$^5$ eV<hv<5×10$^6$ eV

Production of pairs: 5×10$^6$ eV<hv

The Quantum models developed allow to determinate with a reasonable precision approach, the minimum energies for an ultraviolet photon or x ray photon being absorbed on several layers of the atom by the photoelectric effect. Using the following rough description of the results from Hartree's Theory to estimate the excitation energy:

$$E = \frac{m_0 e^4}{(4\pi\varepsilon_0)^2 2\hbar^2}\left(\frac{Z_n}{n}\right)^2 = E_b\left(\frac{Z_n}{n}\right)^2$$

Where:

| | |
|---|---|
| Atom excitation energy | E |
| Electron rest mass | $m_0$ = 9,109 × 10$^{-31}$ kg |
| Electron charge | e = 1,602 × 10$^{-19}$ C |
| Coulomb's law constant | $1/4\pi\varepsilon_0$ = 8,988 × 10$^9$ Nm$^2$/C$^2$ |
| Planck's constant | $\hbar = h/2\pi$ = 1,055 × 10$^{-34}$ Js |
| Bohr's energy | $E_B$ = 2.17 × 10$^{-18}$ J = 13.6 eV |

For the lead atom, chosen only as a reference and not restrictive, we have the following distribution of electrons on the layers:

| Element | Z | Simbol | K | L | M | N | O | P |
|---|---|---|---|---|---|---|---|---|
| Lead | 82 | Pb | 2 | 8 | 18 | 32 | 18 | 4 |

Following, after tabling the theoretical estimating of hv energy from the incident photon, for producing a hole on each of the two firsts and the last layer more crowded external, at the fudamental state of the lead atom, where $Z_n$ is the effective Z for the layer and E* (eV) experimental value related to Fermi's level:

| n | Layer | Zn | E (eV) | E* (eV) |
|---|---|---|---|---|
| 1 | K | 80 | 87040 | 88005 |
| 2 | L | 72 | 17626 | 15861 |
| ... | ... | ... | ... | ... |
| 6 | P | 6 | 13.6 | 18.1 |

What, inside the available scientific literature, and from the adopted energies on the forecasted system, very below 5×10$^5$ eV, demonstrates that the process where radiation is iterating with the lead from the accumulator plates, shown in invention, is predominately photoelectric.

Generalizing, it is important to mention that for other accumulators with electrodes made with materials of other chemical elements, with atomic number lower than 82, the minimum energies for a photon being absorbed by photoelectric effect in one of the corresponding absorption boards are much lower.

Figure 2B:
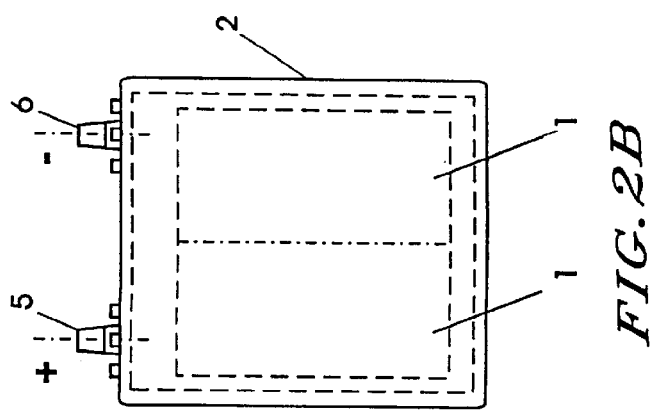
Figure 2A:
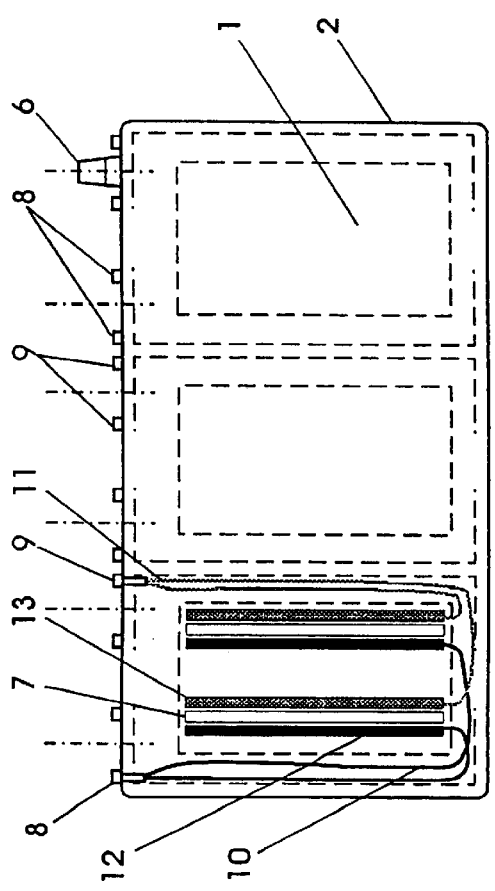
Figure 2C:
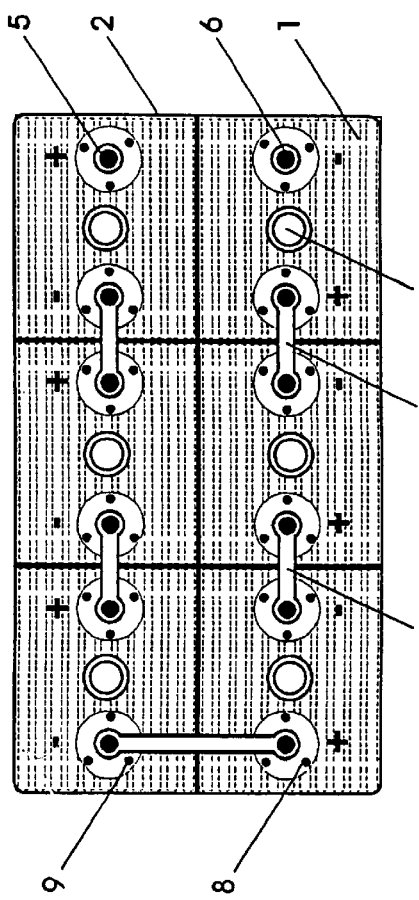

On FIGS. 2A–2C, consider the three view as being a generic accumulator, but, for elucidative purpose, the mostly common accumulator of the industry was adopted, that is, a lead-acid battery with six cells with serial connection and a nominal tension of 12V, constituted by the common elements used:

(1) Cell or vase, at this particular case in number of six (2) Case or frame of the accumulator (3) Crossbar or bars for cells interconnection (4) Air vent, not necessary for the armoured configuration (5) Terminal or positive pole (6) Terminal or negative pole (7) Appropriate carton sheet The present invention uses, as shown in FIGS. 2A–2C, preferentially two groups of accumulators in a parallel connection having each of them, one or more accumulators in a serial connection, because the efficacy of the system is proportional of the operational voltage, adding to the conventional accumulators, preferentially "2n" polarized terminals, being half of the terminals with positive polarization (8) and the other half of negative polarization (9) to serve preferentially "4n" conductors branch lines, being the positive conductors lines (10) and the negative conductors lines (11), adopting one branch conductor line for each positive plate (12) and other for the negative plate (13). The inferior borders of the positive conductors (10) and from the negative conductors (11), that are appropriately isolated for operation in aggressive electrolytes, are connected preferentially as close as possible of the center of the inferior borders of each positive plate (12) and each negative plate (13) of the accumulator, than, at this illustration, are "2n" conductors branch lines of positive polarization and "2n" lines of negative polarization (11). The superior borders of the conductors branch lines (10) and (11) are symmetrically connected to the correspondent polarized terminals (8) and (9). The number of positive polarized terminals (8) and negative polarized terminals (9) is directly related to the electrical conductivity of the adopted materials, the accumulator capacity, the number and dimensions of the plates and to the cell heating (1), caused by the impedance of the circuits that serve the electrodes, forcing then, that the transmission of the radiant energy occur in an orientated sequential way in all the cells. The practice, starts using preferentially the number of negative plates (13), of lead identical to the number of positive plates (12), of lead peroxide $PbO_2$. The system is cellular and sequential, because the terminals of positive polarization (8) and the terminals of negative polarization (9) where the cells plates (1) are excited through the electrical field, are linked between the cells, preferentially in a parallel connection, receiving and transmitting radiant energy through the conductors branch lines on all the cells (1) simultaneously, but, with a random distribution of cyclical way in the time and sequential way in the space, because each of the terminals of positive polarization (8) and each terminal of negative polarization (9) energizes preferentially two positive conductors branch lines (10) and two negative conductors branch lines (11), neighbors lines, that serve the respective positive (12) and negative (13) plates in strategic pre-defined regions to guarantee the optimization of the homogeneity of the thermodynamic effects on the cells.

Figure 3:
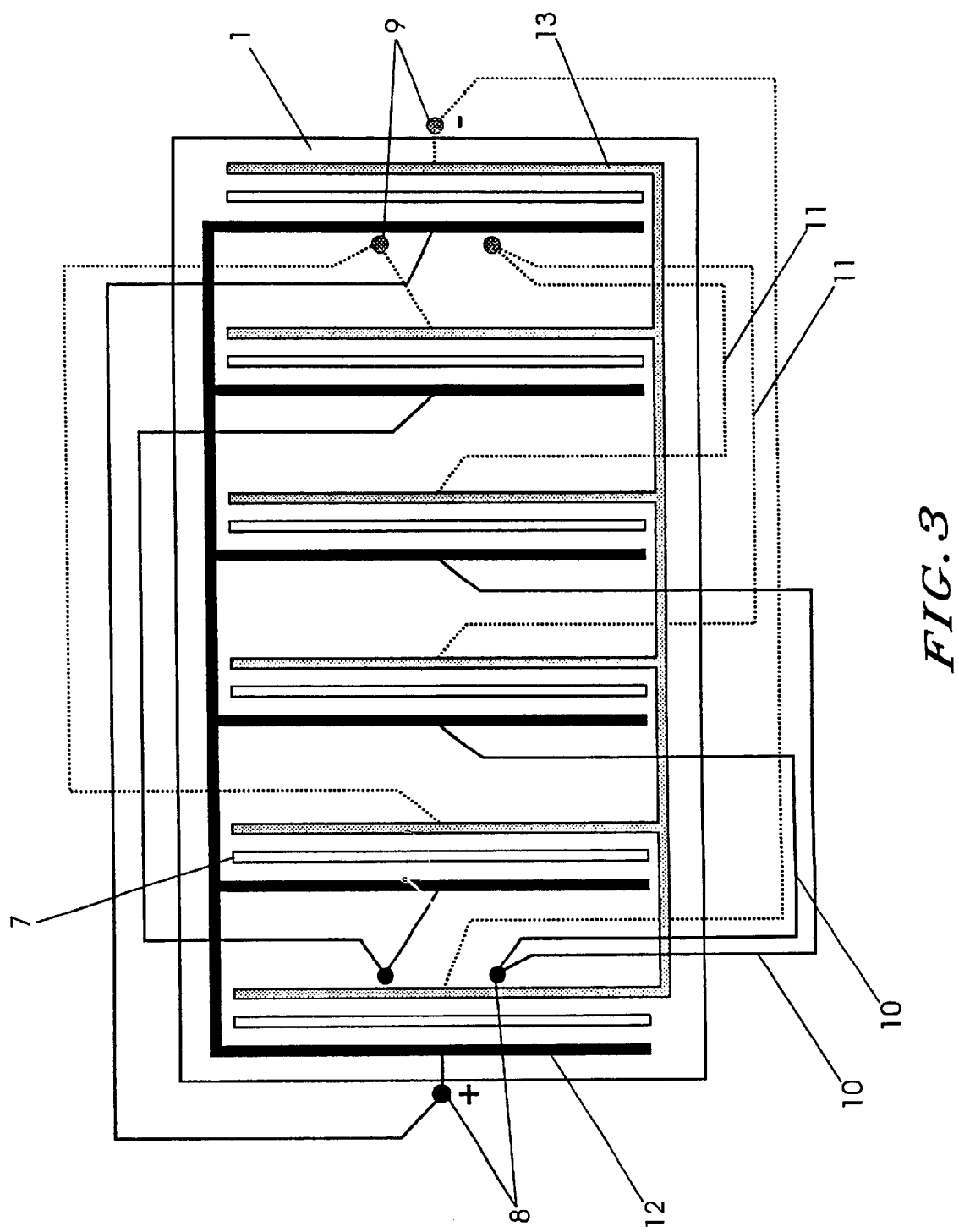

In FIG. 3 is shown only the plan of junctions for one cell (1) for the excited recharging through radiant energy, ultra fast of high power, through the terminals of positive polarization (8), pictorially represented in a darker color and the negative polarization terminals (9) in a lighter color, that feed respectively the positive branch lines (10) in darker lines and the negative branch lines (11) in dotted lines, that cause the radiant energy on the positive plates (12) and negative plates (13) activated by the respective inferior borders, that are separated by an appropriate canon sheet (7). The energization order of the illustrated polarized terminals is symmetric, with the positive polarization terminals in a clockwise sequence and the negative polarization terminals in the opposite way, or vice versa, but with a synchronized symmetry random starting in any pair. At the particular case of this illustration with a lead acid accumulator preferentially adopting plates with a smaller thickness and small quantities of electrolytes in solutions with $H_2SO_4$ concentrations, that could be different from the usual, allowing the usage of additives like salts, preferentially $Na_2SO_4$, for increasing the speed of the reactions through a primary saline effect, that spreads to all the ionic species present on the solution and not only the reactive ions; so with plain charges densities, that could be different of 1.26 $g/cm^3$, depending on the objective to attend: a faster recharging or a longer life to the accumulator.

The present invention revolutionizes by a totally new process the energy generators systems and the process of recharging accumulators making the charges available through radiant energy by a new process of high energetic efficiency by higher tensions than the used on the actual recharges, in distinct cells, in a pre-defined sequence, optimizing the temperature gradients and allowing to make ultra fast charges on accumulators.

What is claimed is:

1. A radiant system in accumulators and a resultant product therefrom, which entails by transferring charges among the plates of the accumulators and or capacitors, through pulses that stimulate radiation that interacts with matter generating energy through a process mainly photoelectric, caused by the waves of matter of the electron acceleration on positive and negative plates, incorporated to at least two accumulators groups, with 2n polarized terminals, being one half of the terminal with positive polarization and the other half of negative polarization to serve 4n conductors branch lines, being the positive conductors lines and the negative conductors lines, adapting one branch conductor line for each positive plate and other for each negative plate, with the inferior borders of the positive conductors and from the negative conductors connected near the center of the inferior borders of each positive plate and each negative plate of the accumulator, with the superior borders of the conductors branch lines and connected to the correspondent polarized terminal and, resulting on the transmission of the radiant energy in a sequential way orientated in the cells.

2. The radiant system in accumulators and resultant product therefrom according to claim 1, wherein the terminal of positive polarization and the terminals of negative polarization excite the cell plates through the electrical field, linked between the cells, in a parallel connection, receiving and transmitting radiant energy through the conductor branch lines in all the cells simultaneously, but, with a random distribution of cyclical way in time and sequential way in space, as each of the terminals of positive polarization and each terminal of negative polarization energizes two positive conductors branch lines and two negative branch lines neighbors correspondent, that serve the respective positive and negative plates in strategic pre-defined regions.

3. The radiant system in accumulators an resultant product therefrom, according to the claim 1, wherein transferring the charge through a pulsating process in short time intervals in the positive plates and negative plates, from the extremities to the center of the cells.

4. The radiant system in accumulators an resultant product therefrom, according to the claim 1, wherein the clockwise energizing of the positive polarized terminals, and counter-clockwise for the negative polarized terminals, or vice versa, yet with synchronized symmetry.

5. The radiant system in accumulators an resultant product therefrom, according to the claim 1, wherein the use of preferentially thinner plates and solutions with concentrations different than the usual, depending on the result to be obtained: a faster recharge or a longer life for the accumulator.

6. The radiant system in accumulators an resultant product therefrom, according to the claim 1, wherein the use of positive plates and negative plates in metallic film under appropriate guards and lower quantity of electrolyte.

7. The radiant system in accumulators an resultant product therefrom, according to the claim 1, wherein the use of the pair of plates with the higher ratio between area and perimeter for each geometrical shape used.

8. The radiant system in accumulators an resultant product therefrom, according to the claim 1, wherein the association or constitution of accumulators which case has the greater number of cells to operate with higher voltages, obtaining more energy efficiency.

\* \* \* \* \*